July 2, 1963  T. F. CUMMINGS  3,095,654
EDUCATIONAL DEVICE

Filed Sept. 14, 1961  2 Sheets-Sheet 1

INVENTOR
THOMAS F. CUMMINGS

BY *JL L Steling*

ATTORNEY

July 2, 1963  T. F. CUMMINGS  3,095,654
EDUCATIONAL DEVICE
Filed Sept. 14, 1961  2 Sheets-Sheet 2

United States Patent Office 3,095,654
Patented July 2, 1963

3,095,654
EDUCATIONAL DEVICE
Thomas F. Cummings, Poughkeepsie, N.Y., assignor to International Business Machines Corporation, New York, N.Y., a corporation of New York
Filed Sept. 14, 1961, Ser. No. 138,134
15 Claims. (Cl. 35—9)

This invention relates to mechanical aids for teaching and more particularly to a device for displaying questions, answers and instructions controlled by the student in accordance with the progress made in the subject being taught.

Due to the tremendous amount of material needed to teach the advances in the technical sciences, individual classroom instruction has become extremely difficult. Also, the class can only proceed at a pace set by the poorest student. To overcome this and advance the better student at a pace set by himself, home study aids have been devised such as recordings for teaching languages and home study condensed courses. In none of these, however does the student receive immediate evaluation of the progress made. The modern concept of teaching is to present a subject to a pupil at a rate that is determined by his progress and this requires more or less personal attention by the instructor. To overcome this, there are now machines that will ask the questions and supply the answers under control of the student. These present the material appropriate to the student's development and provide him with immediate results of his work.

In order to present a subject in an orderly and progressive manner by a device of this order, the operation of the machine must be programmed. By programming, the student is prevented from advancing to the next question until he has given the correct answer or he has been given further instruction to fully understand the subject.

The device embodying the present invention uses visual means of instruction provided by a projector that may use either slides or movie film. It is therefore the principal object of this invention to provide a means for controlling the feed of the slide or film in accordance with the student's progress.

Another object is to provide a control means directly associated with the slide or film.

A further object is to provide a control means that will cause a display of further instructions or a new question in accordance with the student's answer.

A still further object is to provide an electrical circuit prepared by the slide and completed by the student for either displaying further instructions or causing the feed of the slide to thereby display a new question.

Another object is to provide an adjustable control means on the slide or slide mount for preparing circuits that may be selectively completed by the student to feed the slide on selecting a current answer or unmask further instruction on selecting a wrong answer.

A slide or strip film projector is provided with a keyboard. The keyboard contains any desired number of "answer" keys in the present instance, preferably three. Each slide is provided with adjustable controls that prepare circuits when the slide is in a display position. A question and three possible answers together with two instructions that will assist the student should the wrong answer be selected are contained on each slide. The question and possible answers are immediately visible on the projector screen. The instructions are masked until the student actuates a key selecting an answer which, if wrong, will complete one of the prepared circuits to cause the unmasking of an instruction that will indicate to the student wherein he was in error. If the correct answer is selected, the next slide or film frame is fed to display a new question, with its associated answers and instructions.

The foregoing and other objects, features and advantages of the invention will be apparent from the following more particular description of the preferred embodiments of the invention, as illustrated in the accompanying drawings:

Figure 1:
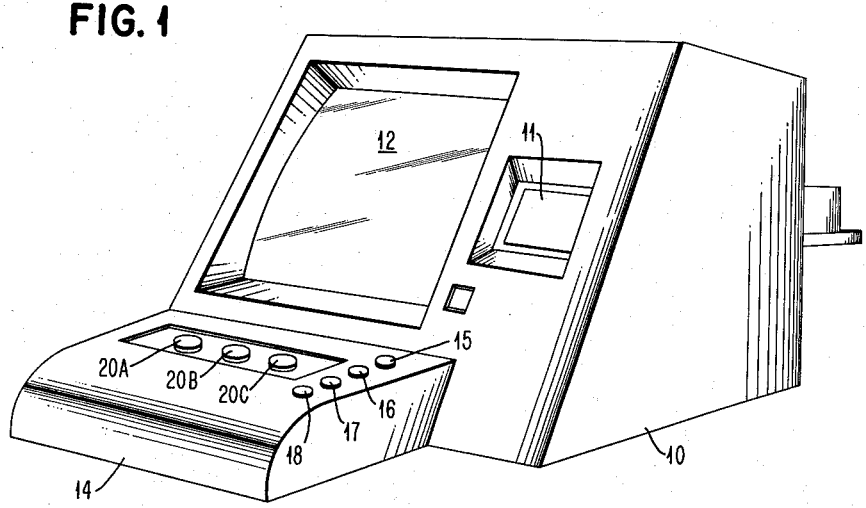
FIG. 1 is a perspective view of the device embodying the invention.

The invention may be used with any well known make of projector 10 similar to that shown in FIG. 1 in which the slides are placed in metal or plastic mounts that are slidably housed in a magazine 11. A small motor, not shown, moves the slides out of the magazine into a lens path that projects the picture onto a screen 12. Normally the feed is controlled from a remote point by a set of control switches. This control has now been located in a keyboard 14 in the form of a start key 15, stop key 16, forward key 17 and reverse key 18. With these keys, the magazine can be fed forward and backward and the feeding of slides started and stopped. At each increment of feed a slide is displayed on the screen. No attempt will be made to describe this mechanism or control circuit as they have no part in the invention outside an auxiliary control of the feed motor as will be described later.

Keyboard 14 is provided with three additional keys 20A, 20B, and 20C by which the student can indicate a selection of answers to a question appearing on the screen.

Figure 2:
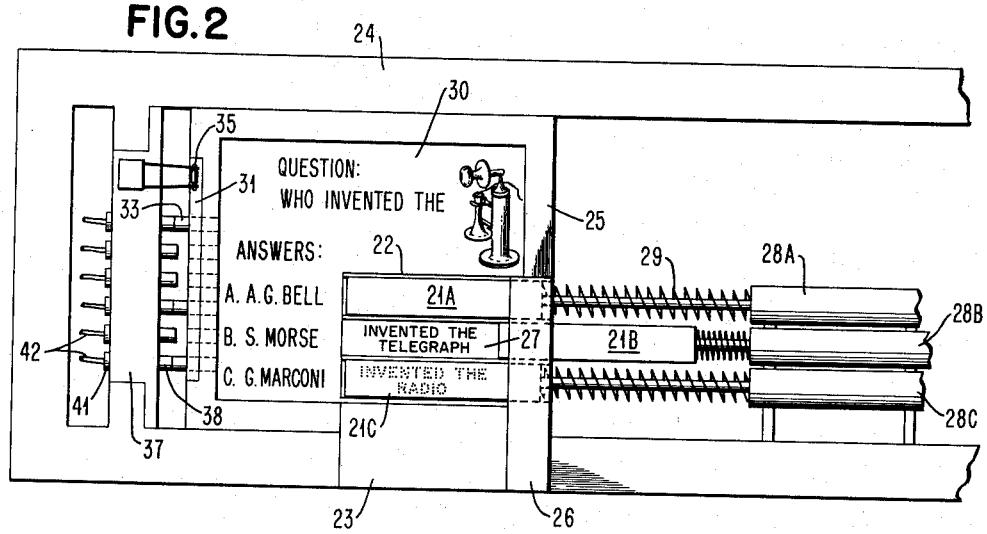
FIG. 2 is a detail showing the slide mount in position with relation to the masking means and the slide track.

One method of presenting data to the student is shown in FIG. 2. It is noted that the slide frame, guide and masking mechanism are shown reversed from the position they normally occupy in the projector. This has been done to permit easy reading of the data on the slide and make a clearer showing of the invention. Here the question is asked by print and a picture and the instructions are listed alongside the key designations such as A, B, and C. There are obviously many other methods of displacing data such as pictures for both question and answer and instructions in print. In some instances the instructions may include reference to textbook pages.

In the present instance, all the data is carried on the slide or film and only the questions and answers are visible when projected on the screen. The instructions are masked at this time by panels 21A, 21B and 21C. These panels are slidably mounted in a frame 22 secured to a base 23 which is in turn secured to the members 24 that are formed to act as guides in moving the slide mounts 25 from the magazine 11 to the projecting position. The panels 21 are held in place by a flat comb member 26 secured to base 23. Base 23 is slotted at 27 to permit data on the slide to be projected when unmasked by the removal of a panel such as 21B by a solenoid such as 28B. The springs 29 hold the panels 21 in masking position.

The slide frame 25 may be of any plastic or insulating material into which the photographic slide 30 is inserted before being placed in the magazine 11. The slide mounts are fed seriatim from the magazine as it is fed through the projector.

Figure 3:
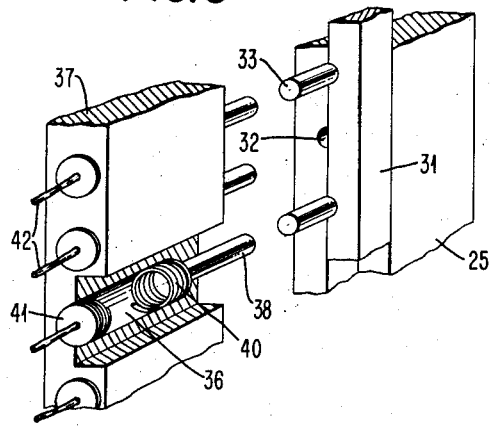
FIG. 3 is a perspective view in detail of one edge of a slide mount and the guide member showing the contact members.

Molded in the leading edge of each slide mount 25, FIG. 3, is a metal bar 31 preferably of copper. Also molded adjacent the plate 31 are a series of half round holes 32. These are provided to accommodate metal plugs or contacts 33 preferably of copper. Each plug has one half its length ground to fit the holes 32. This configuration prevents rotation of the plug in the mount. The bar 31 acts as a common bus bar for all contacts 33 inserted in the mount. The holes 32 are arranged in pairs and a contact 33 inserted in one of a pair will complete a "yes" circuit and in the other a "no" circuit. By use of the plug contacts 33 the instructor programs each slide in accordance with the data contained thereon as will be described in more detail later. A spring pressed contact finger 35 secured to member 37 contacts bar 31 when a slide mount is fed into projecting position. This provides a supply circuit for all the contacts 33.

Located in apertures 36 in a block 37 of plastic (FIGS. 2 and 3) are shouldered contacts 38. A spring 40 acting against a metallic screw plug 41 forces the contact outward in position to be engaged by a contact 33 on a slide mount. Plug 41 may be of any well known contact material. Leads 42 secured to the plugs 41 connect individual circuits to the contacts 38.

As mentioned above, one contact 33 is used when the answer in that location is correct (a "yes" circuit) and the other when it is incorrect (a "no" circuit). In other words, the correct answer can be in any one of three positions and the contact 33 must be in the "yes" location of that position. In accordance with the question and answers shown in FIG. 2, the correct answer lies under the slide 21A and therefore a plug 33 is inserted in the upper or "yes" hole at that position. At the other two positions a plug 33 will be inserted in the "no" hole.

Figure 4:
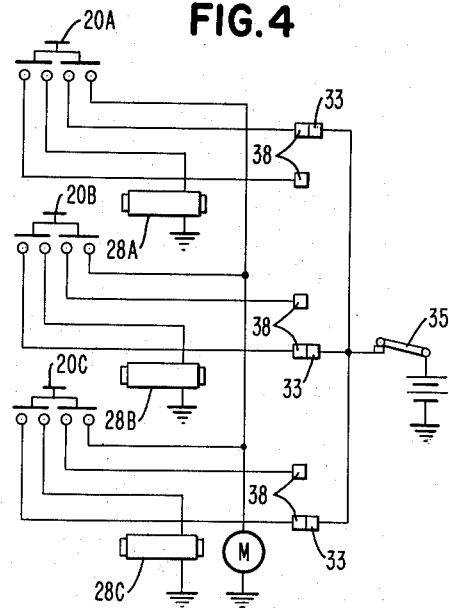
FIG. 4 is a schematic of the circuit used with a mount of FIG. 2.

The circuit for controlling the projector by the student is shown in FIG. 4. If the student depresses key 20A, indicating that Alexander Bell invented the telephone, a circuit is closed from ground through motor M, upper "yes" contacts of key 20A, contacts 38—33, bar 31, contact 35 to battery, to drive the motor M driving the feed to retract the present slide, step the magazine forward and insert the next slide. If the student had depressed either of the other keys, a circuit would have closed to actuate either solenoid 28B or 28C sliding either panel 21B or 21C to unmask such instructions as "He invented the telephone" or "He invented the radio."

Figure 5:
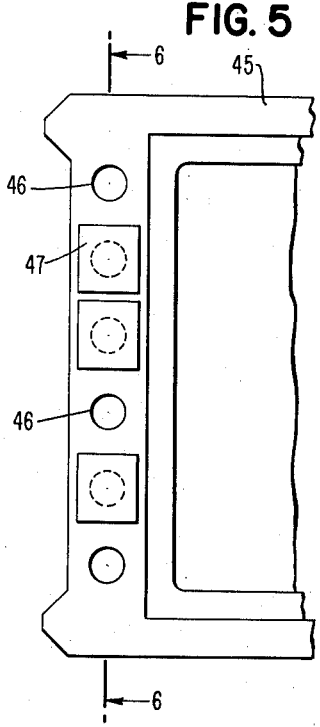
FIG. 5 is a detail of the slide mount for use with a photoelectric sensing means.

In FIG. 5 is shown another form of a slide mount 45 having holes 46 in the margin thereof. In programming, one of the two holes associated with each answer may be made effective by removing a plug or patch such as 47 from the hole. These holes may be sensed by any well known form of photoelectric sensing device, such as shown in FIG. 6.

Figure 6:
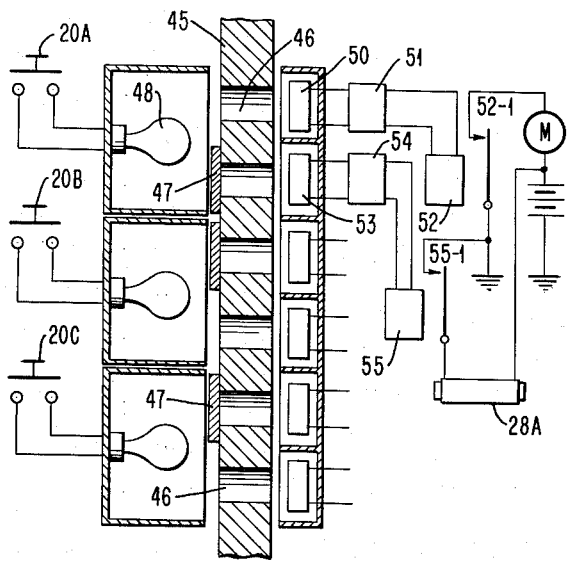
FIG. 6 is a schematic of the circuit used with the mount of FIG. 5.

Should the student actuate key 20A in FIG. 6, a lamp 48 common to a pair of apertures 46 will pass light through the upper aperture of the pair since the lower is covered by a patch. Since this is a "yes" circuit, a circuit will be closed to actuate the drive motor M as follows: light from lamp 48 through hole 46 will activate photo cell 50, the output of which will be amplified by amplifier 51 to actuate a relay 52. The relay contacts 52-1 will in turn close the motor circuit, to cause the slide to be withdrawn and another to be fed in its place displaying a new question.

If the instructor had desired that an instruction be given upon operation of key 20A, the slide mount would have been programmed by placing a patch 47 over the "yes" hole 46 resulting in the operation of key 20A closing a circuit to cause light from lamp 48 to activate the "no" circuit through cell 53, amplifier 54, relay 55, contacts 55-1, to operate solenoid 28A. As will be recalled, solenoid 28A will actuate a panel 21A to uncover an instruction.

It is obvious that holes could be provided in strip film that could be masked by tape or by punching holes in the desired locations to control a photoelectric circuit.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An educational device comprising a screen, a projector for displaying data on said screen, a plurality of transparent slides containing said data, mounts for said slides, a slide changer adapted to hold and feed said slides to said display position, masking means for covering a portion of said data when in display position, and manually positioned control means on said mounts for selectively actuating said masking means and slide changer.

2. An educational device comprising a screen; a projector for displaying on said screen data comprising a question, a plurality of answers, and a corresponding group of instructions; a plurality of slides each carrying a related grouping of said data; a mount for each slide; a motor driven slide changer adapted to hold and feed said mounts seriatim; said changer feeding an individual mount into a display position; means for masking that portion of said slide containing said instructions when in display position; a "yes" circuit controlling said slide changer motor and a "no" circuit controlling said masking means; a plurality of keys one associated with each answer; and contact pins selectively positioned in said mount whereby one of said circuits associated with each answer is prepared for completion by one of said keys.

3. An educational device comprising a screen; a projector for displaying on said screen data composed of a question, a plurality of answers, and a corresponding group of instructions; a plurality of slides each carrying a related group of said data; a mount for each slide; a motor driven slide changer adapted to hold and feed said mounts seriatim; said changer feeding an individual mount into display position; a circuit controlling said slide changer motor; a plurality of keys one associated with each answer; and pins selectively positioned in said mount whereby said motor circuit is prepared for completion by one of said keys.

4. An educational device comprising a screen; a projector for displaying data composed of a question, a plurality of answers, and a corresponding group of instructions on said screen; a plurality of transparencies each carrying said data, a mount for each transparency, a slide changer adapted to hold and feed said mounts seriatim into a display position, means for masking that portion of said transparency containing said instructions when in display position, a circuit controlling said masking means, a plurality of keys one associated with each answer, and contact pins selectively positioned in said mount whereby a circuit for actuating said masking means associated with each answer is prepared for completion by one of said keys.

5. A slide changer for a projector comprising, a mount containing a photographic transparency, a frame in said projector, feeding means for advancing said mount to a display position in said frame, contacts in said frame, additional contacts selectively positioned in said mount adapted to make contact with said first named contacts when said mount is in display position whereby a circuit is prepared for operating said feeding means.

6. A slide changer for a projector comprising, a mount containing a photographic transparency, a frame in said projector into which said mount is fed to a display position, a masking means covering a portion of said transparency when in said display position, contacts in said frame, additional contacts selectively positioned in said mount adapted to engage said first named contacts when said mount is in display position whereby a circuit is prepared for operating said masking means.

7. A slide changer for a projector comprising, a mount containing a photographic transparency, a frame in said projector, feeding means for advancing said mount to a display position in said frame, spring mounted pin contacts in said frame, additional pin contacts selectively positioned in said mount adapted to make contact with said first named contacts when said mount is in projecting position whereby a circuit is prepared for operating said feeding means.

8. An educational device comprising a screen, a projector for displaying data composed of a question, a plurality of answers, and a corresponding group of instructions on said screen, a plurality of transparencies each carrying a grouping of said data, a mount for each transparency, a slide changer adapted to hold and feed said mounts seriatim into a display position, electro-mechanical means for masking that portion of said transparency containing said instructions when in display position, a circuit controlling said electro-mechanical means, a plurality of keys one associated with each answer, and contact pins selectively positioned in said mount whereby a circuit for actuating said masking means associated with each answer is prepared for completion by one of said keys.

9. A slide changer for a projector comprising, a mount for a photographic transparency, a feeding means, a frame in said projector into which said mount is fed by said means to display position, a source of light mounted on one side of said frame, a photo cell mounted on the opposite side of said frame, apertures in said mount adapted to be selectively uncovered to permit actuation of said cell by said light when said mount is in display position to prepare a circuit for controlling said feeding means.

10. A slide changer for a projector comprising, a slide mount, a feeding means, a frame in said projector into which said mount is fed by said means to display position, a photoelectric circuit, apertures in said mount adapted to be selectively uncovered to permit completion of said circuit when said mount is in display position whereby a second circuit is prepared for controlling said feeding means.

11. An educational device comprising a screen, a projector for displaying data composed of a question, a plurality of answers and a corresponding group of instructions on said screen, a plurality of slides each carrying said data, a mount for each slide, a motor driven slide changer adapted to hold and feed said mounts seriatim, said changer feeding an individual mount into a display position, means for masking that portion of said slide containing said instructions when in display position, a photoelectric circuit controlling said slide changer motor and a second photoelectric circuit controlling said masking means, a plurality of keys one associated with each answer, and apertures selectively uncovered in said frame whereby one of said circuits associated with each answer is prepared for completion by one of said keys.

12. An educational device comprising a screen, a projector for displaying on said screen data comprising a question, a plurality of answers and a corresponding group of instructions, a plurality of slides each carrying a related grouping of said data, a mount for each slide, a motor driven slide changer adapted to hold and feed said mounts seriatim, said changer feeding said mount into a display position, means for masking that portion of said slide containing said instructions when in display position, a "yes" photoelectric circuit controlling said slide changer motor and a "no" photoelectric circuit controlling said masking means associated with each answer, a plurality of keys one associated with each answer for completing a circuit for actuating said masking means or drive motor, apertures in said mount adapted to be selectively uncovered whereby one of said circuits associated with each answer is prepared for completion by one of said keys.

13. A frame of insulating material for mounting a photographic transparency, semi-circular apertures in said frame having their axis located in a common plane, a bar of electrical conductive material secured in said frame having one edge thereof aligned with the axis of said apertures and pins of electrical conductive material having a portion of the length thereof formed in semi-circular configuration said pins being selectively positioned in said apertures in accordance with the subject matter of said transparency and in conductive relation with said bar.

14. A frame of insulating material for mounting a photographic transparency, apertures in said frame having their axis located in a common plane, a bar of electrical conductive material secured in said frame having one edge thereof aligned with the axis of said apertures and members of electrical conductive material selectively positioned in said apertures in accordance with the subject matter of said transparency and in conductive relation with said bar.

15. A frame of insulating material for mounting a photographic transparency, apertures in said frame having their axis located in a common plane, and means for selectively closing said apertures in accordance with the subject matter of said transparency.

References Cited in the file of this patent

UNITED STATES PATENTS

| | | |
|---|---|---|
| 2,062,453 | Hastings | Dec. 1, 1936 |
| 2,401,434 | Mills | June 4, 1946 |
| 2,564,089 | Williams | Aug. 14, 1951 |
| 2,720,137 | Museback et al. | Oct. 11, 1955 |
| 2,965,975 | Briggs | Dec. 27, 1960 |